US011248823B2

(12) United States Patent
Vause et al.

(10) Patent No.: US 11,248,823 B2
(45) Date of Patent: Feb. 15, 2022

(54) CHILLER PLANT WITH DYNAMIC SURGE AVOIDANCE

(71) Applicant: Trane International Inc., Davidson, NC (US)

(72) Inventors: Christopher R. Vause, Austin, TX (US); Scott A. Munns, Onalaska, WI (US); Lee R. Cline, West Salem, WI (US)

(73) Assignee: Trane International Inc., Davidson, NC (US)

( * ) Notice: Subject to any disclaimer, the term of this patent is extended or adjusted under 35 U.S.C. 154(b) by 211 days.

(21) Appl. No.: 16/559,367

(22) Filed: Sep. 3, 2019

(65) Prior Publication Data

US 2021/0063057 A1    Mar. 4, 2021

(51) Int. Cl.
*F25B 1/04* (2006.01)
*F25B 49/02* (2006.01)
*F04D 27/02* (2006.01)

(52) U.S. Cl.
CPC .............. *F25B 1/04* (2013.01); *F25B 49/022* (2013.01); *F04D 27/02* (2013.01); *F04D 27/0223* (2013.01); *F25B 2313/004* (2013.01); *F25B 2500/07* (2013.01); *F25B 2600/02* (2013.01)

(58) Field of Classification Search
CPC ............ F25B 2313/004; F25B 2500/07; F25B 2600/02; F25B 2600/13; F04D 27/02; F04D 27/0223; F04D 27/0261
USPC ................................................... 62/181, 183
See application file for complete search history.

(56) References Cited

U.S. PATENT DOCUMENTS

| 5,600,960 A | 2/1997 | Schwedler et al. |
|---|---|---|
| 6,532,754 B2 | 3/2003 | Haley et al. |
| 6,636,893 B1 | 10/2003 | Fong |
| 6,679,072 B2 | 1/2004 | Pham et al. |
| 8,543,343 B2 | 9/2013 | Jones et al. |
| 8,977,405 B2 | 3/2015 | Shiel |
| 9,244,444 B2 | 1/2016 | Carty et al. |
| 10,184,482 B2 * | 1/2019 | Amou ................. F04D 27/0284 |
| 2010/0198409 A1 | 8/2010 | Hartman |
| 2013/0338837 A1 | 12/2013 | Hublou et al. |
| 2014/0229146 A1 | 8/2014 | Gonzalez et al. |
| 2015/0253027 A1 | 9/2015 | Lu et al. |

FOREIGN PATENT DOCUMENTS

JP            2019074220 A  *  5/2019  .............. F25B 1/053

* cited by examiner

*Primary Examiner* — Frantz F Jules
*Assistant Examiner* — Daniel C Comings
(74) *Attorney, Agent, or Firm* — Womble Bond Dickinson (US) LLP (57) ABSTRACT

Systems, apparatus and methods for operating a chiller plant while minimizing or eliminating the occurrence of centrifugal compressor surge. Taking into account chiller design specifications and current operating conditions, a compressor lift point at which surge is predicted to occur is established. Minima and maxima for various chiller setpoints that avoid or eliminate the occurrence of compressor surge are imposed on setpoints provided by a conventional optimizing chiller controller. The chiller system is operated in accordance with the resultant anti-surge setpoints. Coolant tower flow is modulated to enable the compressor to operate at near-surge conditions while preventing the onset of actual surge.

24 Claims, 7 Drawing Sheets

CHILLER PLANT WITH DYNAMIC SURGE AVOIDANCE

TECHNICAL FIELD

The present disclosure is directed to chiller plants, and more particularly, to methods of avoiding centrifugal compressor surge to enable more efficient chiller plant operation.

BACKGROUND

A chiller is an air conditioning system which provides a temperature conditioned fluid, usually water, for use in conditioning the air of a load such as a building. Chillers are typically used in large air conditioning systems which centralize the air conditioning requirements for a large building or complex of buildings by using water or a similar fluid as a safe and inexpensive thermal transport medium.

In its operation, the chiller provides conditioned water of a particular temperature for use in cooling air in a building by means of a first water loop referred to as the evaporator loop or chilled water loop. Heat is extracted from the building air, transferred to the water in the chilled water loop, and is returned via the chilled water loop to an evaporator, which again refrigerates the water to the desired temperature by transferring the heat of the water to the chiller's refrigerant. After the refrigerant is compressed by a compressor, the heat in the refrigerant is transported to a condenser and heat is transferred to a second water loop referred to as the condenser water loop. Centrifugal compressors are often employed for this purpose because of their high efficiency. The condenser loop transports heat from the condenser of the chiller system to a cooling tower or towers which then transfers the heat from the condenser loop to outdoor ambient air by direct contact between the ambient air and the water of the condenser loop. The cooled water returns to the condenser to again absorb heat transferred from the refrigerant.

Centrifugal compressors used in chiller systems are rated in terms of load and lift. Load refers to the compressor's air conditioning load capacity, and is typically expressed in tons or kilowatts. Lift refers to the maximum increase in pressure the compressor can achieve from inlet to outlet and may be expressed as a pressure (e.g., psi, kPa, or bar). Alternatively, because pressure and temperature are inextricably related, lift may also be expressed as a temperature (e.g., 50° F. of lift). If the difference in refrigerant pressure between inlet and outlet exceeds the lift capability of the compressor, refrigerant is forced backwards into the discharge port compressor, causing a sudden collapse of refrigerant flow known as compressor surge. Compressor surge has several undesirable consequences: energy that went into pressurizing the refrigerant is lost; extreme stress is placed on the compressor components such as impeller blades, bearings, housing and seals; and large swings occur in the electrical power drawn by the compressor motor. Continued occurrence of surge over time can cause compressor failure.

Known chiller plant control techniques utilize optimizing controllers that provide setpoint recommendations and attempt to optimize a quantity such as to minimize energy consumption, cost, other variables, or combinations thereof. Such optimizing controllers may employ, for example, artificial intelligence-based (AI) or Model Predictive Control (MPC) techniques. Such controllers may have drawbacks. For example, when optimizing controllers explore to find local minima with regards to their reward function, they can push the chiller system into operating conditions that cause compressor surge. A method to operate a chiller plant while reducing the risk of compressor surge would be a welcome advance.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later.

According to an embodiment of the present disclosure a method of operating a chiller system includes determining a predicted surge lift temperature difference of a centrifugal compressor of the chiller system, calculating anti-surge condenser water minimum and maximum temperature limits, calculating anti-surge condenser water minimum and maximum flow rate limits, establishing an anti-surge condenser water temperature setpoint as a provisional condenser water temperature setpoint constrained between the anti-surge condenser water minimum and maximum temperature limits, establishing an anti-surge condenser water flow rate setpoint as the provisional condenser water flow rate setpoint constrained between the anti-surge condenser water minimum and maximum flow rate limits, and operating the chiller system in accordance with the anti-surge condenser water temperature setpoint and the anti-surge condenser water flow rate setpoint.

In embodiments, the method includes receiving a provisional entering condenser water temperature setpoint and a provisional condenser water flow rate setpoint from an optimization controller.

In embodiments, the method includes calculating a minimum and a maximum limit on the number of cooling tower cells, establishing a number of cooling tower cells setpoint as a provisional number of cooling tower cells setpoint constrained between the minimum and maximum limits on the number of cooling tower cells, and operating the chiller system in accordance with the number of cooling tower cells setpoint.

In embodiments, the method includes receiving the provisional number of cooling tower cells setpoint from an optimizing controller.

In embodiments of the method, determining a predicted surge lift temperature difference comprises determining an active chiller load percentage and determining the predicted surge lift temperature difference as a function of active chiller load percentage.

In embodiments, the method includes determining a minimum aggregate condenser water flow rate based at least in part upon a number of running chillers, the design minimum condenser water flow of each running chiller, and the design minimum water flow of each available cooling tower cell.

In embodiments, the method includes receiving design data characterizing non-alterable properties of the chiller system, wherein design data is selected from the group consisting of chiller design tons, chiller design rejection tons, minimum condenser water flow, maximum condenser water flow, minimum cooling tower cell flow, and maximum cooling tower cell flow.

In embodiments, the method includes receiving active data characterizing alterable properties of the chiller system, wherein active data is selected from the group consisting of active leaving chiller water temperature, active entering condenser water temperature, and active chiller tons.

According to another embodiment of the present disclosure, a device can comprise a processor and a memory that stores executable instructions that, when executed by the processor, facilitate the performance of a method as described above. According to another embodiment of the present disclosure, the described device can be included in a chiller system.

BRIEF DESCRIPTION OF THE DRAWINGS

Various embodiments of the disclosed system and method are described herein with reference to the drawings wherein.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure is described herein in terms of functional block components and various processing steps. It should be appreciated that such functional blocks and/or processing steps may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language, with the various algorithms being implemented with any combination of data structures, objects, processes, routines or other programming elements. The object code created may be executed by any device, on a variety of operating systems.

Figure 1:
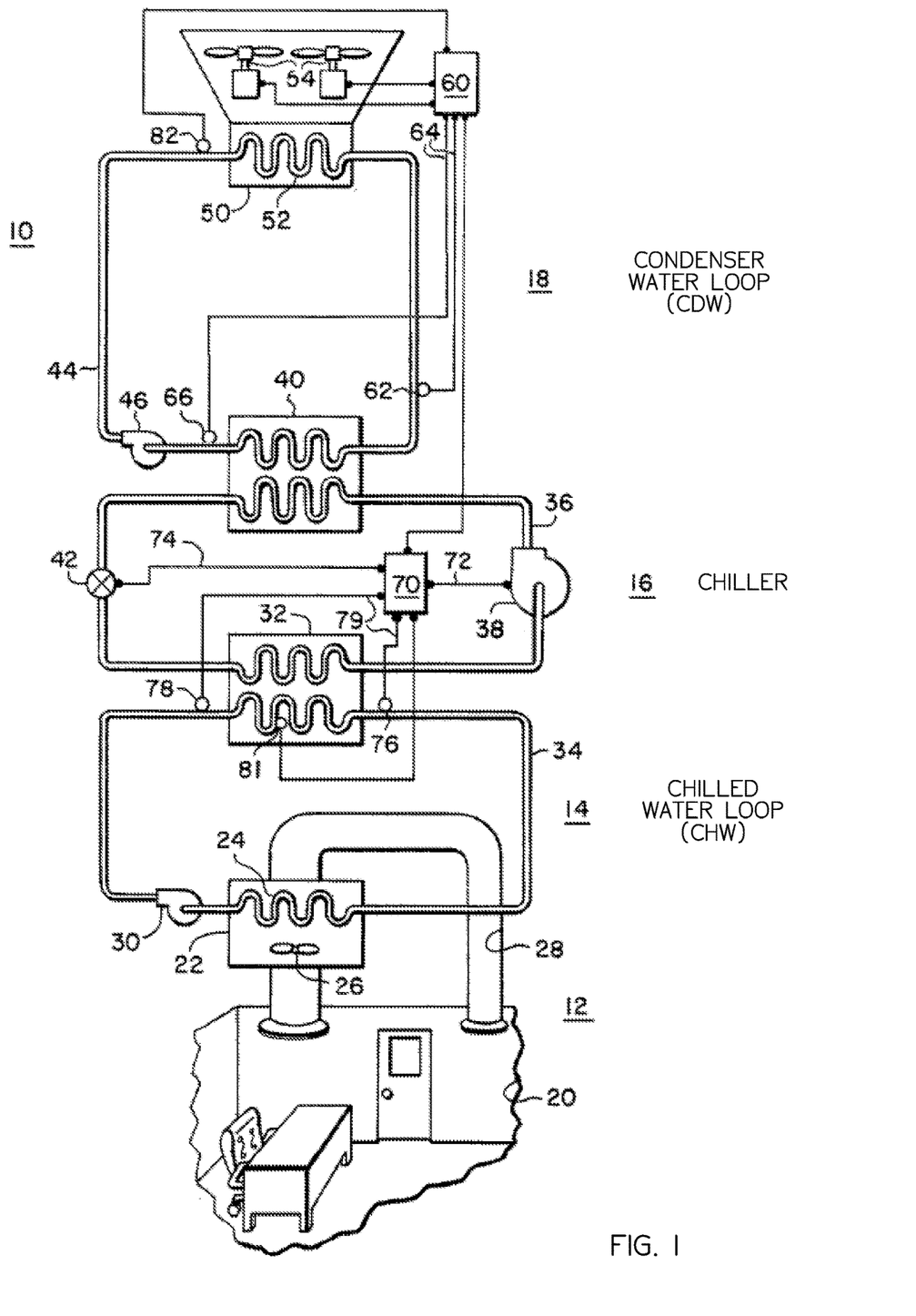
FIG. 1 is a diagram of a chiller system including a chiller having a centrifugal compressor and a cooling tower in accordance with an exemplary embodiment of the present disclosure.

FIG. 1 shows a chiller system 10 which includes an air side loop 12, a chilled water loop (e.g., evaporator loop) 14, a chiller 16, and a condenser water loop (e.g., cooling tower loop) 18. In the air side loop 12, a load such as a space 20 to be air conditioned is cooled by an air handler 22. The air handler 22 may also be used for heating but is described in terms of a single application, cooling, for ease of explanation. The air handler 22 uses the fluid transported by chilled water loop 14 to transfer heat energy from air being circulated from the space 20 by means of a fan 26 and ductwork 28 to a heat exchange coil 24 in air handler 22. The present example embodiment, the transport fluid is water.

The transport fluid in chilled water loop 14 is circulated by a pump 30 between the air handler 22 and the evaporator 32 of chiller 16. The evaporator 32 conditions the transport fluid to a predetermined temperature (for example, 44° F.) so that the fluid can be reused and transported via piping 34 to any one of various air handlers 22. The energy extracted from the transport fluid by the evaporator 32 is transported by refrigeration conduit 36 to a centrifugal compressor 38 which raises the pressure and temperature of the refrigerant circulating in conduit 36 so that the refrigerant can be condensed by a condenser 40, effectively transferring energy to the condenser water loop 18. A metering device 42 such as an expansion valve or orifice maintains the pressure differential between the evaporator 32 and the condenser 40. The system may include an economizer, which would employ multiple metering devices 42 and an additional refrigeration connection to the centrifugal compressor 38 at an intermediate pressure (not explicitly shown).

The heat of condensation in the condenser 40 is transferred to condenser water loop 18 where that heat is transported by conduit 44 and a water pump 46 to at least one cooling tower 50. In the present example embodiment the cooling tower 50 includes heat exchange surfaces 52 to transfer heat from the condenser water loop 18 to ambient air, and includes cooling tower fans 54 which move ambient air over the heat exchange surfaces 52. In embodiments, heat exchange surfaces 52 employ a dry cooling method whereby transport fluid is retained within conduits and heat is transferred into the ambient outdoor air via conduction or radiance. In embodiments, heat exchange surfaces 52 employ an evaporative cooling method whereby transport fluid flows in direct contact with the ambient outdoor air to effectuate evaporative cooling. In embodiments, heat exchange surfaces 52 transfers heat into another fluid medium, such as a natural or man-made body of water. In embodiments, cooling tower 50 may employ a combination of dry, evaporative, and/or fluid cooling.

A cooling tower controller 60 controls the speed and staging of the cooling tower fans so as to maintain a near optimal entering condenser water (CDW) temperature as monitored by a sensor 62 and reported to the controller 60 by a connecting line 64. The sensor 62 can be located in the conduit 44 or in a sump or basin (not shown) of the cooling tower 50. Similarly, a chiller controller 70 determines whether a chiller is active and controls the chiller operation by a connecting line 72 to the compressor 38 and line 74 to the expansion valve 42. Leaving cooling tower water temperature is monitored by a sensor 62 and reported to the controller 60.

Sensors 76 and 78 are provided to monitor the chilled water (CHW) temperature leaving evaporator 32 and entering evaporator 32, respectively. Electrical lines 79 are provided to connect those sensors 76 and 78 to the controller 70. In some embodiments, sensors 76 and 78 connect to controller 70 using wireless communication. Measuring the difference between the water temperature entering evaporator 32 as measured by the sensor 78 and the water temperature leaving evaporator 32 as measured by the sensor 76 provides one way to determine the actual load on any given chiller, particularly when the flow rate in the chilled water loop, as measured by a sensor 81, is also known. Actual load on chiller 16 may be expressed as active chiller tons. In embodiments, sensor 81 determines flow rate by measuring the pressure drop across the evaporator. In embodiments, sensor 81 includes a water flow meter to measure flow directly.

As mentioned in the background section, the functions of cooling tower controllers 60 and/or chiller controllers 70, which may include optimizing techniques, can potentially push a chiller system into operating ranges that cause compressor surge.

Figure 2:
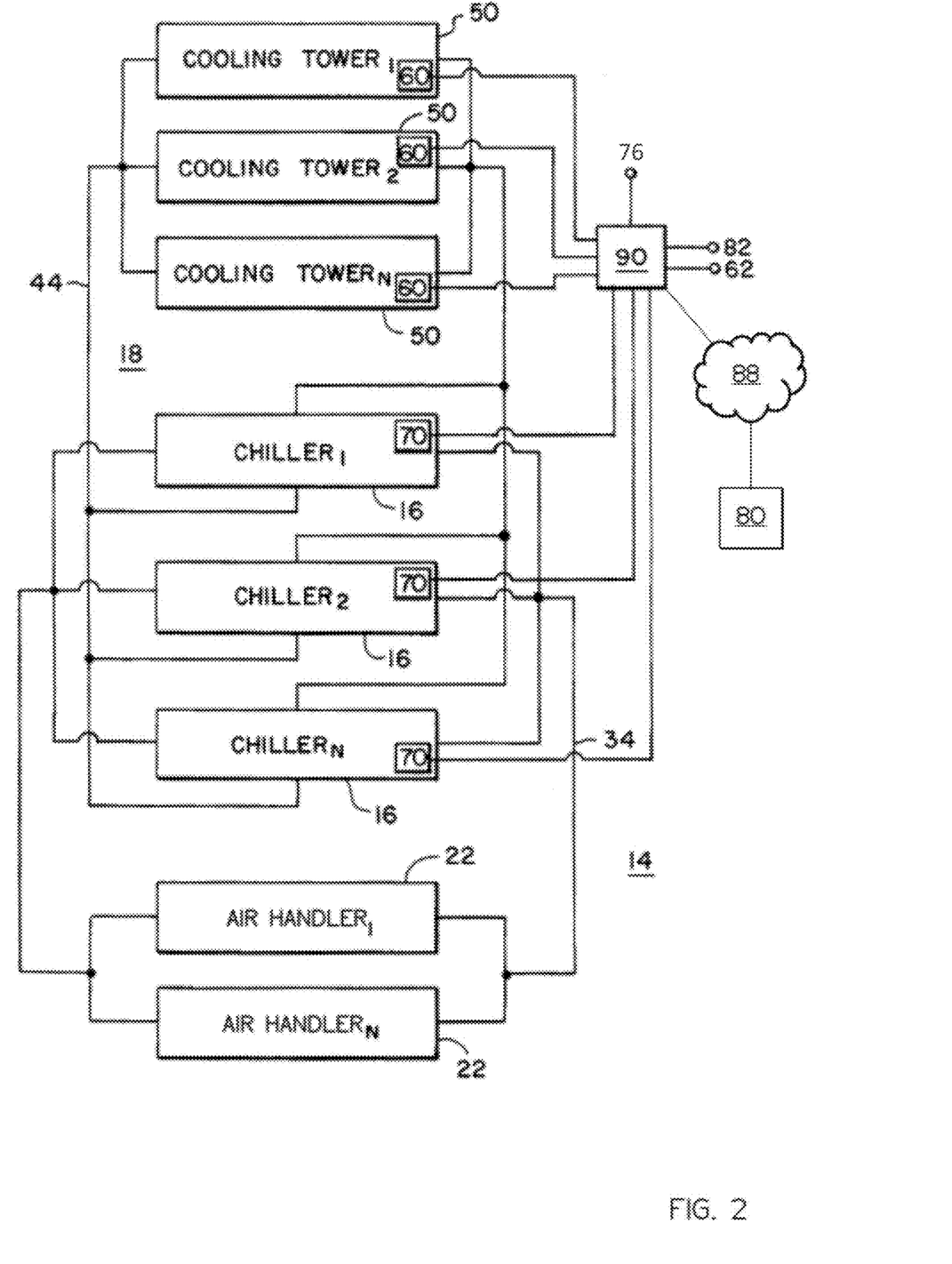
FIG. 2 is a diagram of a chiller system showing piping arrangements for multiple cooling towers and multiple chillers in accordance with the exemplary embodiment of FIG. 1.

An anti-surge controller 90 sets operational limits on the individual controllers 60, 70 of each equipment group 50, 16. As shown in FIG. 2, each cooling tower 50 has an individual tower controller 60, and each chiller 16 has an individual chiller controller 70. Varying configurations of controllers 60 and 70 are contemplated. For example, and without limitation, in some embodiments, any number of tower controllers 60 and chiller controllers 70 may be incorporated in a single control unit, while in other embodiments, a tower controller 60 may control multiple or all cooling towers 50, while in yet other embodiments, a chiller controller 60 may control multiple or all chillers 16. Similarly, various configurations of chillers 16 and cooling towers 50 are contemplated, including, without limitation one or more chillers 16 connected to one or more cooling towers 50. The anti-surge controller 90 is operably connected to each cooling tower controller 60 and to each chiller controller 70. Additionally, anti-surge controller 90 can be arranged to receive the input signals from condenser water temperature sensors 62 and 66, chilled water temperature sensors 76 and 78, and flow rate sensor 82 for processing and, optionally, to share (receive or transmit) such signals with tower controllers 60 and to chiller controllers 70. For this reason, anti-surge controller 90 includes a processor for undertaking the calculations described with respect to FIGS. 3A-C and for forwarding the anti-surge entering condenser water temperature setpoint, anti-surge condenser water flow setpoint, and, for systems having multiple cooling tower cells, the anti-surge number of tower cells setpoint to the cooling tower controllers 60 and/or chiller controllers 70, and for forwarding other information to the controller 60, 70 such as the inputs from the sensors, user inputs, and other operational data. A remote optimizing controller 80 is communicatively coupled to anti-surge controller 90 via a data network 88, such as the Internet. Anti-surge controller 90 can be arranged to share temperature, flow, control, and setpoint data with a remote optimizing controller 80. In embodiments, remote optimizing controller 80 is a cloud-based controller that provides anti-surge control as a service. In embodiments remote optimizing controller 80 enables remote monitoring and control of system 10.

With reference to FIG. 2, the terms chiller, cooling tower and air handler are used both in the singular and plural sense throughout this disclosure. For example, FIG. 2 shows a plurality of chillers 16 piped in parallel (shown) or in series (not shown) to provide the cooling water to the chilled water loop 14 by means of conduit 34. The water is provided to a plurality of air handlers 22 also piped in parallel. Similarly, the cooling towers 50 are piped in parallel in the condenser loop 18 by means of conduit 44 and connected with the condensers 40 of the various chillers. Thus the chiller controllers 70 can turn on chillers 16 as needed to meet the air handler load by maintaining a particular temperature in chilled water loop 14. Similarly, the cooling tower controllers 60 can turn on cooling towers 50, stage fans 54, or vary the fan speed of the fans 54 in those cooling towers 50 to maintain a particular water temperature in condenser water loop 18.

The various controllers 60 activate the fans 54, activate the cooling towers 50, and/or vary the fan speed and activate pumps and/or vary the pump speed to maintain the desired water temperature in condenser water loop 18. Meanwhile, the various chillers 16 are activated and controlled to handle the load in an energy-efficient manner. At each load, the chiller controller 70 will vary the centrifugal compressor impeller rotational speed and/or the inlet guide valve (not shown) position or positions to maximize efficiency while avoiding surge.

In this regard, the anti-surge controller 90 utilizes a set of design inputs and operational inputs to determine a set of boundaries for various setpoints that will prevent controllers 60, 70 from operating the chiller system 10 beyond any limits that would induce surge conditions. For each chiller, a ratio is established between the chiller's active (i.e., reflecting current operating conditions) tonnage and its design tonnage to determine the chiller's active load as a percentage of design capacity. Throughout this disclosure, design inputs are essentially dictated by equipment characteristics and are unchanged by the disclosed methods, and are generally identified herein by the term "design." Throughout this disclosure, active values are essentially dictated by current operating conditions or setpoints, and are generally identified herein by the term "active."

Using an approximation function of the lift surge line and the leaving chilled water temperature for each chiller, a maximum entering condenser water temperature is determined. With the percentage of running load of the chiller, anti-surge controller 90 approximates the active condenser rejection tons. The rejection tons value allows anti-surge controller 90 to establish appropriate combinations of flow and temperature delta between the leaving and entering condenser water pipes at the chiller that will prevent operating chiller 16 at conditions that induce compressor surge. Note that, given one of flow or temperature, the complementary value of the other may be determined. Embodiments of the described disclosure may be operated in a flow-priority manner, a temperature-priority manner, or using weighted combinations of flow and temperature.

Figure 3A:
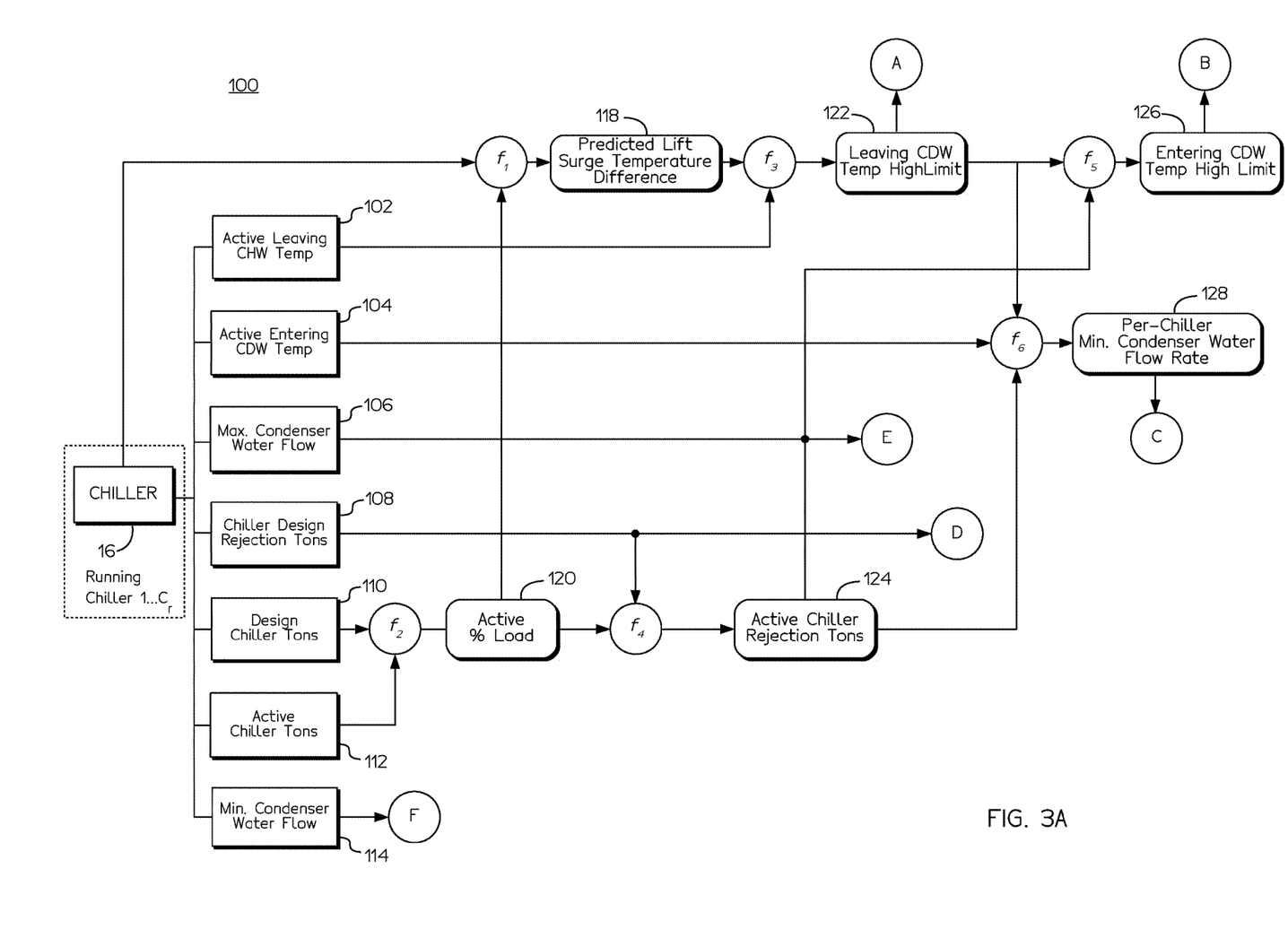
FIGS. 3A-3C is a data flow diagram of a method for efficient operation of a centrifugal chiller plant with dynamic surge avoidance in accordance with an exemplary embodiment of the present disclosure.
Figure 3B:
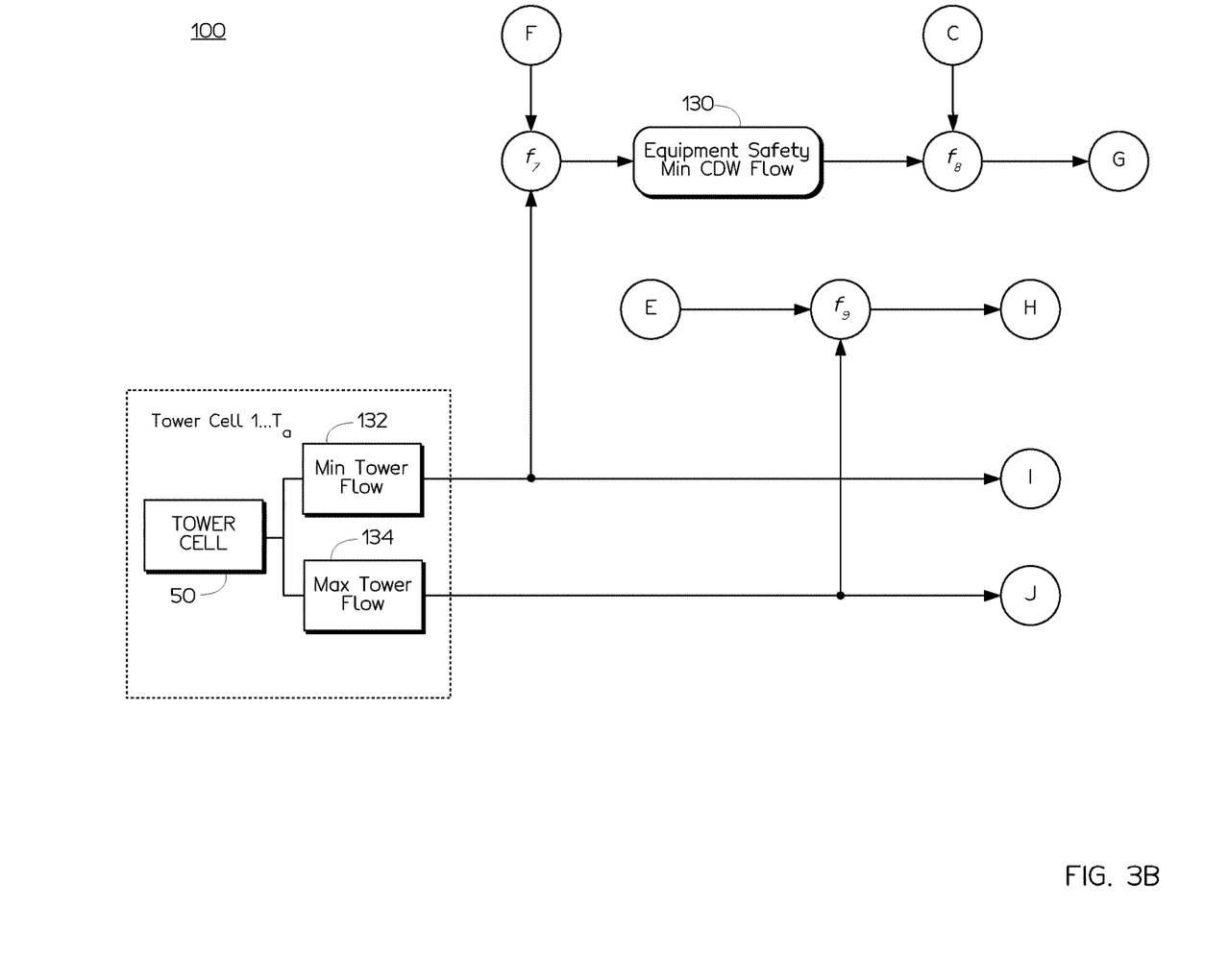
Figure 3C:
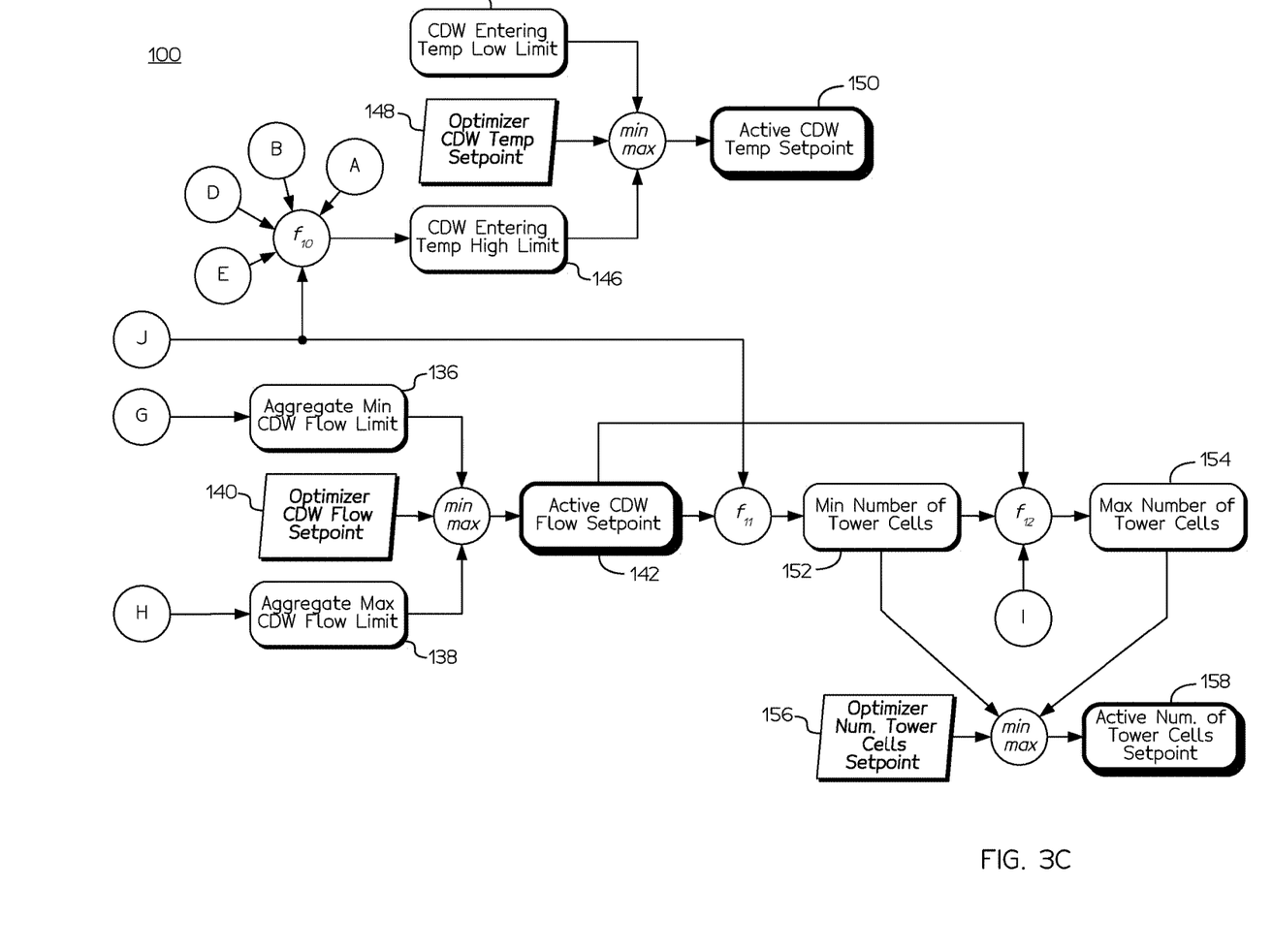

FIGS. 3A-C illustrate a data flow diagram 100 showing the operation of an exemplary embodiment of an anti-surge controller 90 in accordance with the present disclosure. Anti-surge controller 90 receives setpoint data as determined, for example, by tower controller 60, chiller controller 70, and/or remote optimizing controller 80, and modifies or limits such setpoints to reduce or eliminate the occurrence of compressor surge.

As shown in FIG. 3A, the active load of a chiller 16 is determined by the ratio of active chiller tons 112 and chiller design tons 110 to determine the current active chiller load percentage 120. In embodiments, the current active chiller load percentage 120 is determined in accordance with the function $f_2=a/b$, where a is active chiller tons 112 and b is chiller design tons 110. Current active chiller load percentage 120 may be expressed as a percentage. It is noted that the active chiller tons may be expressed as the active evaporator tons.

The product of chiller design rejection tons 108 (e.g., the maximum amount of energy that should be rejected by the condenser system when the chiller is operating at its design conditions) and the active chiller load percentage 120 determine the active chiller rejection tons 124. In the present example embodiment, active chiller rejection tons 124 is determined in accordance with the function $f_4=a*b$, where a is the chiller design rejection tons 108 and b is the active chiller load percentage 120. The predicted lift surge temperature difference 118 (e.g., the lift amount at which surge has a high probability of occurring) is approximated from the active chiller load percentage 120. In the present example embodiment, the predicted lift surge line is a function $f_1$ of active chiller load percentage 120, where $f_1=\min(a, b)$ (the minimum of a and b), where a is y1=0.0456x+55.44, b is y2=0.1x+50, and where x is active chiller load percentage 120.

Note that, for purposes of illustration, the surge prediction function may be characterized graphically as a lift surge line showing a linear relationship between load and predicted surge. In embodiments, the lift surge line may be expressed as two line segments with a break point in the load curve where the slope changes. In yet other embodiments, the surge lift surge line may be expressed as polynomial (e.g., spline) curves, and may include additional input variables from the chiller and/or other parameters.

From the predicted lift temperature difference 118 and active leaving chilled water temperature 102, a chiller leaving condenser water temperature high limit 122 is determined. In the present example embodiment, the leaving condenser water temperature high limit 122 is determined in accordance with a function $f_3=a+b$, where a is the predicted lift temperature difference 118 and b is the active leaving chilled water temperature 102.

From the leaving condenser water temperature high limit 122 and the active chiller rejection tons 124, an entering condenser water temperature high limit 126 is determined. In the present example embodiment, the entering condenser water temperature high limit 126 is determined in accordance with a function $f_5=a-(b*24)/x$, where a is the leaving condenser water temperature high limit 122, b is the active chiller rejection tons 124, and x is the chiller design maximum condenser water flow 106.

The minimum condenser water flow rate for surge avoidance 128 is then determined from the active condenser rejection tons 124, the active condenser water entering temperature 104, and the leaving condenser water temperature limit 122. In the present example embodiment, the minimum condenser flow rate 128 is determined in accordance with the function $f_6=24*x/(a-b)$, where x is active condenser rejection tons 124, a is the chiller leaving condenser water temperature high limit 122, and b is the active chiller entering condenser water temperature 104.

With reference now to FIGS. 3B and 3C, and with continuing reference to FIG. 3A, an equipment safety minimum condenser water flow rate 130, e.g., the absolute minimum flow rate required to safely operate cooling tower 50, is determined from the design minimum individual tower water flows 132 and the minimum individual design chiller condenser water flows 114 (connector F) from each chiller. In the present example embodiment, the equipment safety minimum condenser water flow rate 130 is determined in accordance with the function $f_7=\max(C_r*\max(C_{1dfmin}, C_{2dfmin}, \ldots), \max(T_{1dfmin}, T_{2dfmin}, \ldots))$, where $C_r$ is the number of running chillers, $C_{ndfmin}$ is each running chiller's design minimum condenser water flow 114, $T_{ndfmin}$ is each available tower cell's design minimum water flow 132. Note that, because the number of towers is a function of the active condenser water flow setpoint, it is only required to take a single tower cell's design minimum water flow.

The anti-surge minimum and maximum condenser water flow limits are now established. Minimum and maximum condenser water flow rates are determined, and compared to the condenser water flow rate as determined by tower controller 60 and/or chiller controller 70. An aggregate minimum condenser water flow limit 136 is determined from the safety minimum condenser water flow rate 130 and the per-chiller minimum condenser water flow limit(s) 128 (connector G). The objective here is to determine what the total system maximum condenser water flow could be so that it can be identified as a limit, and maintain the system under this limit during operation. In the present example embodiment, the Minimum Condenser Water Flow Limit 136 is determined in accordance with the function $f_8=\max(C_r*\max(C_{1fmin}, C_{2fmin}, \ldots), m)$ where $C_r$ is the number of running chillers, $C_{nfmin}$ is each running chiller's anti-surge minimum condenser water flow 128, and m is the equipment safety minimum water flow 130.

The maximum condenser water flow limit 138 is determined from the design maximum individual tower water flow 134 and per-chiller design maximum condenser water flow 106 (connector E). In the present example embodiment, the maximum condenser water flow limit 138 is determined in accordance with the formula $f_9=\min(C_r*\min(C_{1dfmax}, C_{2dfmax}, \ldots), T_a*\max(T_{1dfmax}, T_{2dfmax}, \ldots))$ where $C_r$ is the number of running chillers, $C_{ndfmax}$ is each running chiller's design maximum condenser water flow 104, $T_a$ is the number of available tower cells, and $T_{ndfmax}$ is each available tower cell's design maximum water flow 134.

The active, anti-surge condenser water flow setpoint 142 is then determined from the condenser water flow setpoint 140 (as determined by tower controller 60 and/or chiller controller 70) as constrained between the lower and upper anti-surge limits defined by minimum condenser water flow limit 136 and maximum condenser water flow limit 138.

The minimum and maximum number of tower cells that may be staged is now established. The design maximum flow per tower 134 (connector J) and the active condenser water flow setpoint 142 are used to determine the minimum number of tower cells 152. In the present example embodiment, the minimum number of tower cells 152 is determined in accordance with the function $$f_{11} = \max\left(1, \left\lceil \frac{F_{sp}}{T_{fmin}} \right\rceil\right),$$

where $F_{sp}$ is the active condenser water flow setpoint 142, and $T_{fmax}$ is the tower cell design maximum flow 134.

The tower cell design minimum flow 132 (i.e., minimum flow per tower) (connector I), the minimum number of tower cells 152, the active condenser water flow setpoint 142 and the number of available tower cells are used to determine the maximum number of tower cells 154. In the present exemplary embodiment, the maximum number of tower cells 154 is determined in accordance with the function $$f_{12} = \min\left(T_a, \max\left(T_{min}, \left\lfloor \frac{F_{sp}}{T_{fmin}} \right\rfloor\right)\right)$$

where $T_a$ is the number of available tower cells, $T_{min}$ is the minimum number of tower cells 152, $F_{sp}$ is the active condenser water flow setpoint 142, and $T_{fmin}$ is the tower cell design minimum flow 134.

The active number of cooling tower cells setpoint 158 is then determined from the cooling tower cells setpoint 156 (previously determined by tower controller 60 and/or chiller controller 70) constrained between the lower and upper limits defined by minimum number of tower cells 152 and maximum number of tower cells 154.

The entering condenser water temperature setpoint 148, as determined by tower controller 60 and/or chiller controller 70, is constrained between the anti-surge entering condenser water temperature low limit 144 and anti-surge entering condenser water temperature high limit 146. The entering condenser water temperature low limit 144 is the higher of the design low limit values provided by the cooling tower and chiller manufacturer(s).

Anti-surge entering condenser water temperature high limit 146 is determined from leaving condenser water temperature limit 122 (connector A), entering condenser water temperature limit 126, design condenser water rejection tons 108, and the maximum tower water flow 134. In the present example embodiment, the anti-surge condenser water temperature setpoint high limit 146 is determined in accordance with the function $$f_{10} = \min\left(\min(C_{1a}, C_{2a}, \ldots), \left[\frac{(\min(C_{1b}, C_{2b}, \ldots) - x) * 24}{\min(\max(C_{1dfmax}, C_{2dfmax}, \ldots), T_a * \max(T_{1dfmax}, T_{2dfmax}, \ldots))}\right]\right)$$

where $C_{na}$ is a running chiller's entering condenser water temperature high limit 126, $C_{nb}$ is a running chiller's leaving condenser water temperature high limit 122, x is the total active chiller rejection tons, $C_{ndfmax}$ is a running chiller's design maximum condenser flow 106, $T_a$ is the number of available tower cells, and $T_{ndfmax}$ is each available tower cell's design maximum water flow 134.

The anti-surge active condenser water temperature setpoint 150 is then determined from the entering condenser water temperature setpoint 148 (determined by tower controller 60 and/or chiller controller 70) as constrained between the anti-surge entering condenser water temperature low limit 144 and anti-surge entering condenser water temperature high limit 146.

Figure 4:
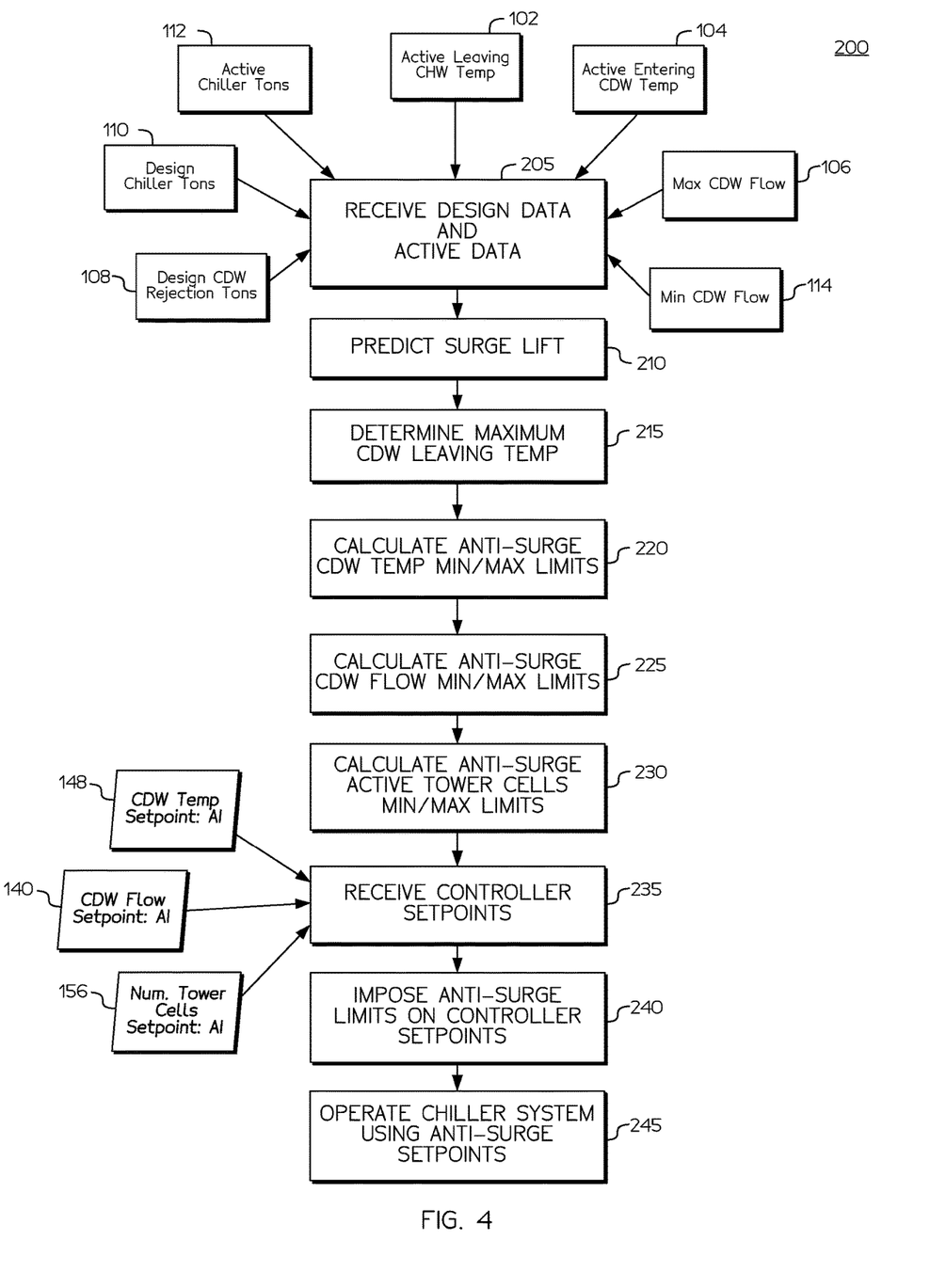
FIG. 4 is a flowchart illustrating a method for efficient operation of a centrifugal chiller plant with dynamic surge avoidance in accordance with an exemplary embodiment of the present disclosure.

Turning now to FIG. 4, a flowchart illustrating an exemplary method 200 for operating a centrifugal chiller plant with dynamic surge avoidance in accordance with the present disclosure is presented. In block 205, the method 200 receives design data and active data representative of the chiller plant. Examples of design data include design chiller tons 110 and design condenser water rejection tons 108. Examples of active data include active chiller tons 112, active leaving chiller water temperature 102, active entering condenser water temperature 104, and minimum and maximum condenser water flow rates 114 and 106, respectively.

In block 210, the predicted lift surge, i.e., the amount of lift likely to cause compressor surge under current operating conditions e.g., load, setpoints, is determined. At block 215, the maximum allowable condenser water leaving temperature is determined. At block 220, the anti-surge condenser water minimum and maximum temperature limits are determined. At block 225, the anti-surge condenser water flow minimum and maximum flow rate limits are determined. At block 230, the anti-surge minimum and maximum number of tower cell limits are determined.

At block 235, the chiller controller condenser water temperature setpoint, chiller controller condenser water flow setpoint, and chiller controller number of tower cells setpoint are received from the optimizing controller.

At block 240, the anti-surge setpoints are determined. In the present example embodiment, the anti-surge condenser water temperature setpoint is set to the cooling tower controller condenser water temperature setpoint as constrained between the anti-surge condenser water minimum and maximum temperature limits. That is, the anti-surge condenser water temperature setpoint is set to the cooling tower controller condenser water temperature setpoint if the cooling tower controller condenser water temperature setpoint is not less than the anti-surge condenser water minimum limit and if the cooling tower controller condenser water temperature setpoint is not greater than the anti-surge condenser water maximum limit. If the cooling tower controller condenser water temperature setpoint is less than the anti-surge condenser water minimum limit, the anti-surge condenser water temperature setpoint is set to the anti-surge condenser water minimum limit. Conversely, if the cooling tower controller condenser water temperature setpoint is greater than the anti-surge condenser water maximum limit, the anti-surge condenser water temperature setpoint is set to the anti-surge condenser water maximum limit. The anti-surge condenser water flow rate setpoint and anti-surge number of tower cells setpoint are determined in similar fashion, i.e., the anti-surge condenser water flow rate setpoint is set to the cooling tower controller condenser water flow rate setpoint as constrained between the anti-surge condenser water minimum and maximum flow rate limits, and the anti-surge number of tower cells setpoint is set to the chiller controller number of tower cells setpoint as constrained between the anti-surge number of tower cells minimum and maximum limits. In block 245 the chiller system is operated in accordance with the anti-surge condenser water temperature setpoint, the anti-surge condenser water flow rate setpoint, and the anti-surge number of tower cells setpoint.

An example embodiment can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
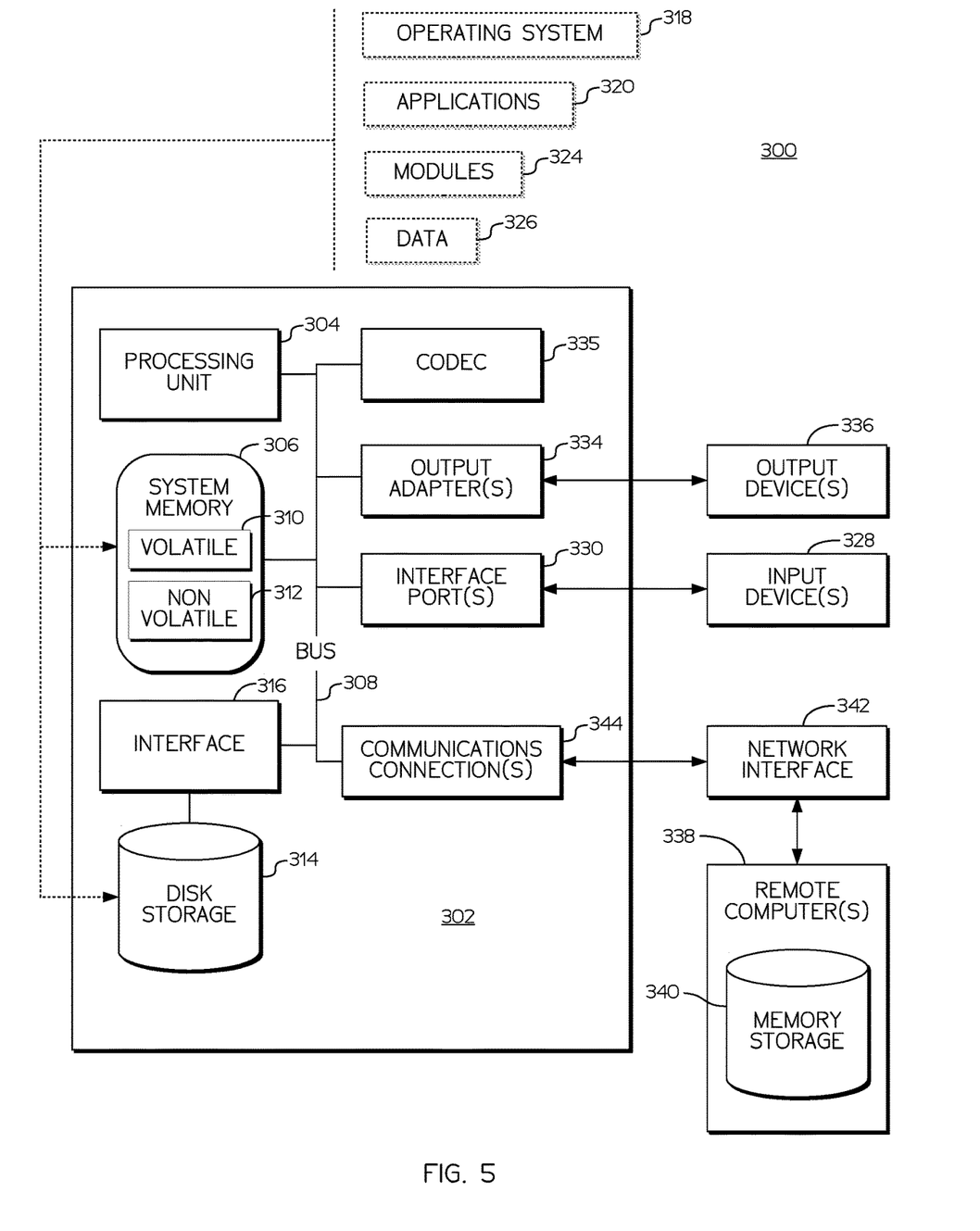
FIG. 5 is a block diagram of an example, non-limiting operating environment in which one or more embodiments described herein can be facilitated.

In connection with FIG. 5, the systems and processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

With reference to FIG. 5, an example environment 300 for implementing various aspects of the claimed subject matter includes a computer 302. The computer 302 includes a processing unit 304, a system memory 306, a codec 335, and a system bus 308. The system bus 308 couples system components including, but not limited to, the system memory 306 to the processing unit 304. The processing unit 304 can be any of various available processors such as an Intel Core™ processor, ARM Cortex A7 processor, and so forth. Dual microprocessors and other multiprocessor architectures also can be employed as the processing unit 304.

The system bus 308 can be any of several types of bus structure(s) including the memory bus or memory controller, a peripheral bus or external bus, or a local bus using any variety of available bus architectures or protocols including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI) Serial Peripheral Interface (SPI), inter-integrated circuit (I2C), embedded MultiMedia Controller (eMMC), Universal Synchronous/Asynchronous Receiver/Transmitter (USART), Secure Digital (SD) Double Data Rate Type 3 (DDR3), and Open NAND Flash interface (ONFI).

The system memory 306 includes volatile memory 310 and non-volatile memory 312, which can employ one or more of the disclosed memory architectures, in various embodiments. The basic input/output system (BIOS), containing the basic routines to transfer information between elements within the computer 302, such as during start-up, is stored in non-volatile memory 312. In addition, according to present innovations, codec 335 can include at least one of an encoder or decoder, wherein the at least one of an encoder or decoder can consist of hardware, software, or a combination of hardware and software. Although, codec 335 is depicted as a separate component, codec 335 can be contained within non-volatile memory 312. By way of illustration, and not limitation, non-volatile memory 312 can include read only memory (ROM), programmable ROM (PROM), electrically programmable ROM (EPROM), electrically erasable programmable ROM (EEPROM), Flash memory, 3D Flash memory, or resistive memory such as resistive random-access memory (RRAM). Non-volatile memory 312 can employ one or more of the disclosed memory devices, in at least some embodiments. Moreover, non-volatile memory 312 can be computer memory (e.g., physically integrated with computer 302 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 310 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 302 can also include removable/non-removable, volatile/non-volatile computer storage medium. FIG. 5 illustrates, for example, disk storage 314. Disk storage 314 includes, but is not limited to, devices like a magnetic disk drive, solid state disk (SSD), flash memory card, or memory stick. In addition, disk storage 314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 314 to the system bus 308, a removable or non-removable interface is typically used, such as interface 316. It is appreciated that storage devices 314 can store information related to a user. Such information might be stored at or provided to a server or to an application running on a user device. In one embodiment, the user can be notified (e.g., by way of output device(s) 336) of the types of information that are stored to disk storage 314 or transmitted to the server or application. The user can be provided the opportunity to opt-in or opt-out of having such information collected or shared with the server or application (e.g., by way of input from input device(s) 328).

It is to be appreciated that FIG. 5 describes software that acts as an intermediary between users and the basic computer resources described in the suitable operating environment 300. Such software includes an operating system 318. Operating system 318, which can be stored on disk storage 314, acts to control and allocate resources of the computer system 302. Applications 320 take advantage of the management of resources by operating system 318 through program modules 324, and program data 326, such as the boot/shutdown transaction table and the like, stored either in system memory 306 or on disk storage 314. It is to be appreciated that the claimed subject matter can be implemented with various operating systems or combinations of operating systems.

A user enters commands or information into the computer 302 through input device(s) 328. Input devices 328 include, but are not limited to, a resistive touch pad, capacitive touch pad, a pointing device such as a mouse, trackball, stylus, touch pad, keyboard, microphone, joystick, or game pad; a satellite dish, a scanner, a TV tuner card, a digital camera, a digital video camera, a web camera, and the like. These and other input devices connect to the processing unit 304 through the system bus 308 via interface port(s) 330. Interface port(s) 330 include, for example, a serial port, a parallel port, a game port, and a universal serial bus (USB). Output device(s) 336 use some of the same type of ports as input device(s) 328. Thus, for example, a USB port can be used to provide input to computer 302 and to output information from computer 302 to an output device 336. Output adapter 334 is provided to illustrate that there are some output devices 336 like monitors, speakers, and printers, among other output devices 336, which require special adapters. The output adapters 334 include, by way of illustration and not limitation, video and sound cards that provide a means of connection between the output device 336 and the system bus 308. It should be noted that other devices or systems of devices provide both input and output capabilities such as remote computer(s) 338.

Computer 302 can operate in a networked environment using logical connections to one or more remote computers, such as remote computer(s) 338. The remote computer(s) 338 can be a personal computer, a server, a router, a network PC, a workstation, a microprocessor-based appliance, a peer device, a smart phone, a tablet, or other network node, and typically includes many of the elements described relative to computer 302. For purposes of brevity, only a memory storage device 340 is illustrated with remote computer(s) 338. Remote computer(s) 338 is logically connected to computer 302 through a network interface 342 and then connected via communication connection(s) 344. Network interface 342 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Computer 302 can operate using the BACnet protocol, which defines a number of data link/physical layers, including ARCNET, Ethernet, BACnet/IP, BACnet/IPv6, BACnet/MSTP, Point-To-Point over RS-232, Master-Slave/Token-Passing over RS-485, ZigBee, and LonTalk.

Communication connection(s) 344 refers to the hardware/software employed to connect the network interface 342 to the bus 308. While communication connection 344 is shown for illustrative clarity inside computer 302, it can also be external to computer 302. The hardware/software necessary for connection to the network interface 342 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating a chiller system, comprising:
   determining a predicted surge lift temperature difference of a centrifugal compressor of the chiller system;
   calculating anti-surge condenser water minimum and maximum temperature limits;
   calculating anti-surge condenser water minimum and maximum flow rate limits;
   establishing an anti-surge condenser water temperature setpoint as a condenser water temperature setpoint constrained between the anti-surge condenser water minimum and maximum temperature limits;
   establishing an anti-surge condenser water flow rate setpoint as a condenser water flow rate setpoint constrained between the anti-surge condenser water minimum and maximum flow rate limits; and
   operating the chiller system in accordance with the anti-surge condenser water temperature setpoint and the anti-surge condenser water flow rate setpoint.

2. The method of operating a chiller system according to claim 1, further comprising receiving an entering condenser water temperature setpoint and the condenser water flow rate setpoint from an optimizing controller.

3. The method of operating a chiller system according to claim 1, further comprising:
   calculating a minimum and a maximum limit on the number of cooling tower cells;
   establishing a number of cooling tower cells setpoint as a number of cooling tower cells setpoint constrained between the minimum and maximum limits on the number of cooling tower cells; and
   operating the chiller system in accordance with the number of cooling tower cells setpoint.

4. The method of operating a chiller system according to claim 3, further comprising receiving the number of cooling tower cells setpoint from an optimizing controller.

5. The method of operating a chiller system according to claim 1, wherein determining a predicted surge lift temperature difference comprises:
   determining an active chiller load percentage; and
   determining the predicted surge lift temperature difference as a function of active chiller load percentage.

6. The method of operating a chiller system according to claim 1, further comprising determining a minimum aggregate condenser water flow rate based at least in part upon a number of running chillers, the design minimum condenser water flow of each running chiller, and the design minimum water flow of each available cooling tower cell.

7. The method of operating a chiller system according to claim 1, further comprising receiving design data characterizing non-alterable properties of the chiller system, wherein design data is selected from the group consisting of chiller design tons, chiller design rejection tons, minimum condenser water flow, maximum condenser water flow, minimum cooling tower cell flow, and maximum cooling tower cell flow.

8. The method of operating a chiller system according to claim 1, further comprising receiving active data characterizing alterable properties of the chiller system, wherein active data is selected from the group consisting of active leaving chiller water temperature, active entering condenser water temperature, and active chiller tons.

9. An anti-surge device for a chiller system, comprising:
   a processor;
   a data interface operatively coupled to the processor and adapted to communicatively couple with a chiller plant and an optimization controller; and
   a memory operatively coupled to the processor storing instructions, which, when executed by the processor, cause the processor to:
   determine a predicted surge lift temperature difference of a centrifugal compressor of the chiller system;
   calculate anti-surge condenser water minimum and maximum temperature limits;
   calculate anti-surge condenser water minimum and maximum flow rate limits;
   establish an anti-surge condenser water temperature setpoint as a condenser water temperature setpoint constrained between the anti-surge condenser water minimum and maximum temperature limits;
   establish an anti-surge condenser water flow rate setpoint as a condenser water flow rate setpoint constrained between the anti-surge condenser water minimum and maximum flow rate limits; and
   operate the chiller system in accordance with the anti-surge condenser water temperature setpoint and the anti-surge condenser water flow rate setpoint.

10. The anti-surge device according to claim 9, wherein the memory further stores instructions, which, when executed by the processor, cause the processor to receive an entering condenser water temperature setpoint and the condenser water flow rate setpoint from an optimizing controller operatively associated with the chiller system.

11. The anti-surge device according to claim 9, wherein the memory further stores instructions, which, when executed by the processor, cause the processor to:
   calculate a minimum and a maximum limit on the number of cooling tower cells;
   establish a number of cooling tower cells setpoint as a number of cooling tower cells setpoint constrained between the minimum and maximum limits on the number of cooling tower cells; and operate the chiller system in accordance with the number of cooling tower cells setpoint.

12. The anti-surge device according to claim 11, wherein the memory further stores instructions, which, when executed by the processor, cause the processor to receive the number of cooling tower cells setpoint from an optimizing controller operatively associated with the chiller system.

13. The anti-surge device according to claim 9, wherein the memory further stores instructions, which, when executed by the processor, cause the processor to determine a predicted surge lift temperature difference by determining an active chiller load percentage and determining the predicted surge lift temperature difference as a function of active chiller load percentage.

14. The anti-surge device according to claim 9, wherein the memory further stores instructions, which, when executed by the processor, cause the processor to determine a minimum aggregate condenser water flow rate based at least in part upon a number of running chillers, the design minimum condenser water flow of each running chiller, and the design minimum water flow of each available cooling tower cell.

15. The anti-surge device according to claim 9, wherein the memory further stores design data characterizing non-alterable properties of the chiller system, wherein design data is selected from the group consisting of chiller design tons, chiller design rejection tons, minimum condenser water flow, maximum condenser water flow, minimum cooling tower cell flow, and maximum cooling tower cell flow.

16. The anti-surge device according to claim 9, wherein the memory further stores active data characterizing alterable properties of the chiller system, wherein active data is selected from the group consisting of active leaving chiller water temperature, active entering condenser water temperature, and active chiller tons.

17. A chiller system, comprising:
at least one chiller having a centrifugal compressor;
at least one cooling tower cell in fluid communication with the at least one chiller;
an optimizing controller in operative communication with the chiller and the cooling tower; and
an anti-surge device in operative communication with the optimizing controller, comprising:
a processor;
a data interface operatively coupled to the processor and adapted to communicatively couple with the optimization controller; and
a memory operatively coupled to the processor storing instructions, which, when executed by the processor, cause the processor to:
determine a predicted surge lift temperature difference of the centrifugal compressor the at least one chiller;
calculate anti-surge condenser water minimum and maximum temperature limits;
calculate anti-surge condenser water minimum and maximum flow rate limits;
establish an anti-surge condenser water temperature setpoint as a condenser water temperature setpoint constrained between the anti-surge condenser water minimum and maximum temperature limits;
establish an anti-surge condenser water flow rate setpoint as a condenser water flow rate setpoint constrained between the anti-surge condenser water minimum and maximum flow rate limits; and
operate the chiller system in accordance with the anti-surge condenser water temperature setpoint and the anti-surge condenser water flow rate setpoint.

18. The chiller system according to claim 17, wherein the memory further stores instructions, which, when executed by the processor, cause the processor to receive an entering condenser water temperature setpoint and the condenser water flow rate setpoint from an optimizing controller operatively associated with the chiller system.

19. The chiller system according to claim 17, wherein the memory further stores instructions, which, when executed by the processor, cause the processor to:
calculate a minimum and a maximum limit on the number of cooling tower cells;
establish a number of cooling tower cells setpoint as a number of cooling tower cells setpoint constrained between the minimum and maximum limits on the number of cooling tower cells; and
operate the chiller system in accordance with the number of cooling tower cells setpoint.

20. The chiller system according to claim 19, wherein the memory further stores instructions, which, when executed by the processor, cause the processor to receive the number of cooling tower cells setpoint from the optimization controller.

21. The chiller system according to claim 17, wherein the memory further stores instructions, which, when executed by the processor, cause the processor to determine a predicted surge lift temperature difference by determining an active chiller load percentage and determining the predicted surge lift temperature difference as a function of active chiller load percentage.

22. The chiller system according to claim 17, wherein the memory further stores instructions, which, when executed by the processor, cause the processor to determine a minimum aggregate condenser water flow rate based at least in part upon a number of running chillers, the design minimum condenser water flow of each running chiller, and the design minimum water flow of each available cooling tower cell.

23. The chiller system according to claim 17, wherein the memory further stores design data characterizing non-alterable properties of the chiller system, wherein design data is selected from the group consisting of chiller design tons, chiller design rejection tons, minimum condenser water flow, maximum condenser water flow, minimum cooling tower cell flow, and maximum cooling tower cell flow.

24. The chiller system according to claim 17, wherein the memory further stores active data characterizing alterable properties of the chiller system, wherein active data is selected from the group consisting of active leaving chiller water temperature, active entering condenser water temperature, and active chiller tons.

* * * * *